(12) United States Patent
Au et al.

(10) Patent No.: US 7,854,123 B2
(45) Date of Patent: Dec. 21, 2010

(54) TURBOMACHINE NOZZLE COVER PROVIDED WITH TRIANGULAR PATTERNS HAVING PAIRS OF VERTICES FOR REDUCING JET NOISE

(75) Inventors: Dax Au, Ivry sur Seine (FR); Pascal Moise Michel Bigot, Moisenay (FR); Pierre Briend, Tours (FR); Pierre Philippe Marie Loheac, Brie Comte-Robert (FR)

(73) Assignee: Snecma, Paris (FR)

( * ) Notice: Subject to any disclaimer, the term of this patent is extended or adjusted under 35 U.S.C. 154(b) by 866 days.

(21) Appl. No.: 11/759,719

(22) Filed: Jun. 7, 2007

(65) Prior Publication Data
US 2008/0047273 A1 Feb. 28, 2008

(30) Foreign Application Priority Data
Jun. 26, 2006 (FR) .................................. 06 52644

(51) Int. Cl.
F02K 1/00 (2006.01)
(52) U.S. Cl. .................... 60/770; 239/265.19; 181/213; 60/226.1
(58) Field of Classification Search ................ 60/226.1, 60/262, 264, 770; 239/265.17, 265.19; 181/213, 181/220
See application file for complete search history.

(56) References Cited

U.S. PATENT DOCUMENTS

| | | | | |
|---|---|---|---|---|
| 4,786,016 A | * | 11/1988 | Presz et al. | 244/130 |
| 6,532,729 B2 | * | 3/2003 | Martens | 60/204 |
| 6,826,901 B2 | * | 12/2004 | Hebert | 60/204 |
| 6,935,098 B2 | * | 8/2005 | Bardagi et al. | 60/262 |
| 7,305,817 B2 | * | 12/2007 | Blodgett et al. | 60/262 |
| 7,392,651 B2 | * | 7/2008 | Goutines et al. | 60/262 |
| 7,469,529 B2 | * | 12/2008 | Feuillard et al. | 60/226.1 |
| 7,520,124 B2 | * | 4/2009 | Narayanan et al. | 60/262 |
| 7,543,452 B2 | * | 6/2009 | Reba et al. | 60/770 |
| 7,546,727 B2 | * | 6/2009 | White | 60/204 |

(Continued)

FOREIGN PATENT DOCUMENTS

FR 2 565 631 A1 12/1985

(Continued)

OTHER PUBLICATIONS

U.S. Appl. No. 11/759,678, filed Jun. 7, 2007, Au et al.

*Primary Examiner*—William H Rodriguez
(74) *Attorney, Agent, or Firm*—Oblon, Spivak, McClelland, Maier & Neustadt, L.L.P.

(57) ABSTRACT

The pattern relates to a cover for a turbomachine nozzle, the cover having a plurality of patterns each with an outline of triangular shape having a base and two vertices that are spaced downstream and interconnected by a side. For each pattern, the vertices present respective curved outlines and they are interconnected by a curved portion presenting a radius of curvature greater than the radii of curvature of the outlines of said vertices, each side being connected to the trailing edge of the cover via a curved outline presenting a radius of curvature greater than the radii of curvature of the outlines of the vertices and greater than the radius of curvature of the outline of the curved portion, and the vertices and the curved portion are inclined radially towards the inside of the cover, with the curved portion being radially offset outwards relative to the vertices.

5 Claims, 2 Drawing Sheets

U.S. PATENT DOCUMENTS

| | | | |
|---|---|---|---|
| 7,578,132 B2 * | 8/2009 | Webster | 60/770 |
| 7,581,384 B2 * | 9/2009 | Au et al. | 60/262 |
| 2005/0115245 A1 * | 6/2005 | Prouteau et al. | 60/770 |
| 2005/0138915 A1 * | 6/2005 | Bardagi et al. | 60/262 |
| 2009/0084111 A1 * | 4/2009 | Aeberli et al. | 60/770 |
| 2010/0005780 A1 * | 1/2010 | Philippe et al. | 60/262 |

FOREIGN PATENT DOCUMENTS

| | | |
|---|---|---|
| FR | 1 496 238 A1 | 1/2005 |
| FR | 1 617 068 A1 | 1/2006 |
| GB | 2 104 967 A | 3/1983 |

* cited by examiner

TURBOMACHINE NOZZLE COVER PROVIDED WITH TRIANGULAR PATTERNS HAVING PAIRS OF VERTICES FOR REDUCING JET NOISE

BACKGROUND OF THE INVENTION

The present invention relates to the general field of reducing noise from the jet leaving a turbomachine nozzle. It relates more particularly to a cover for the nozzle of a separate-stream type turbomachine, which cover is provided with patterns for reducing noise from the jet.

Nowadays sound pollution has become a major concern for engine manufacturers who are being challenged more and more concerning the sound nuisance of their turbomachines. The sources of noise in a turbomachine are numerous, but it has been found that the noise from the jet leaving the nozzle is the predominant noise during aircraft takeoff. Since certification authorities are becoming more and more difficult to satisfy in terms of sound emission from turbomachines, engine manufacturers have been required to make efforts to reduce noise from their turbomachines, and in particular noise from the jet leaving the nozzle.

Typically, a separate-stream nozzle of a turbomachine comprises a primary cover coaxial about the longitudinal axis of the turbomachine, a secondary cover disposed coaxially around the primary cover so as to define a first annular channel along which an outer stream (or cool stream) flows, and a central body disposed coaxially inside the primary cover so as to define a second annular channel along which an inner stream (or hot stream) flows, the primary cover extending beyond the secondary cover.

In such a nozzle, the jet noise comes from mixing between the cool and hot streams and between the cool stream and the outside air flowing round the nozzle. This noise is noise over a broad frequency band generated by two types of sound source: high frequency noise coming from small turbulent structures in the mixing between the cool and hot streams and audible essentially in the immediate vicinity of the nozzle; and low frequency noise coming from large turbulent structures that appear at a distance from the jet.

In order to reduce jet noise, one of the means used is to increase the effectiveness of the mixing between the streams. For this purpose, it is well known to provide one of the covers of the nozzle with a plurality of repeated patterns distributed around the circumference of the trailing edge of the cover. By installing such patterns at the trailing edge of the nozzle cover, mixing between the streams is achieved by creating vortices close to the nozzle so as to better dissipate kinetic energy, and consequently reduce the turbulent intensity of large vortices constituting the major sources of noise.

By way of example, U.S. Pat. No. 6,532,729 describes providing the trailing edges of the primary and secondary covers of the nozzle with a plurality of repeated patterns of triangular shape (referred to as "chevrons") that serve to encourage mixing between the hot and cool streams. Similarly, patent publication US 2002/0164249-A1 proposes providing the trailing edges of the primary and secondary covers of the nozzle with a plurality of repeated patterns of trapezoidal shape (referred to as "crenellations").

Although encouraging mixing between the streams, the patterns mentioned above are not entirely satisfactory. Even if such patterns enable the low frequency component of the jet noise to be reduced, that is generally achieved to the detriment of its high frequency component which remains at a level that is too high.

OBJECT AND SUMMARY OF THE INVENTION

A main object of the present invention is thus to mitigate such drawbacks by proposing a geometrical shape for jet noise reduction patterns for a turbomachine nozzle cover that enables both low frequency and high frequency components of jet noise to be reduced.

This object is achieved by an annular cover for a turbomachine nozzle, the cover having a plurality of patterns extending the trailing edge of said cover and spaced apart circumferentially from one another, each pattern having an outline of substantially triangular shape with a base formed by a portion of the trailing edge of the cover and with two vertices spaced downstream from the base and each connected thereto by a side, in which, in accordance with the invention, for each pattern, each vertex presents a substantially curved outline and the patterns are interconnected by a substantially curved portion having a radius of curvature greater than the radii of curvature of the outlines of said vertices, each side is connected to the trailing edge of the cover via an outline that is substantially curved having a radius of curvature greater than the radii of curvature of the outlines of the vertices and greater than the radius of the outline of the curved portion interconnecting said vertices, and the vertices and the curved portion interconnecting them are inclined radially towards the inside of the cover relative to the trailing edge thereof with the curved portion interconnecting said vertices being offset radially outwards relative to the vertices.

This particular geometry for the noise reduction patterns works on the same principle as the mixers used in stream-mixing turbomachine nozzles. The presence of the curved portion interconnecting the two vertices of the pattern with a radial inclination of smaller magnitude than the inclinations of the vertices serves to produce localized crossing of the hot and cool streams, and consequently accelerates mixing thereof. A result of this better mixing between the streams is a reduction in jet noise both at low frequencies and at high frequencies.

In an advantageous disposition, the vertices of each pattern are situated at heights from the base that are substantially equal.

In another advantageous disposition, at least one of the patterns presents symmetry about a midplane of the pattern containing the axis of symmetry of the cover.

The invention also provides a turbomachine nozzle having a primary cover and/or a secondary cover constituted by a cover as defined above.

The invention also provides a turbomachine including at least one cover as defined above.

BRIEF DESCRIPTION OF THE DRAWINGS

Other characteristics and advantages of the present invention appear from the description given below with reference to the accompanying drawings that show an embodiment having no limiting character. In the figures.

DETAILED DESCRIPTION OF AN EMBODIMENT

Figure 1:
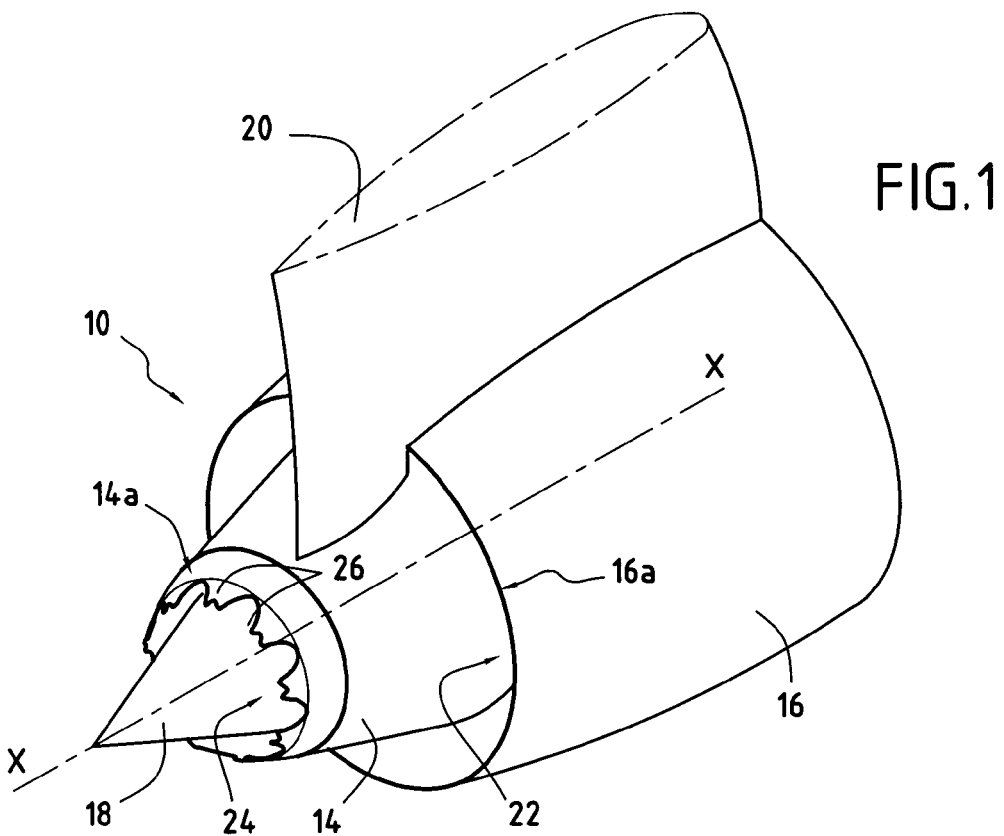
FIG. 1 is a diagrammatic perspective view of a turbomachine nozzle fitted with a cover constituting an embodiment of the invention.

FIG. 1 is a highly diagrammatic perspective view of a separate-stream turbomachine nozzle 10.

The nozzle 10 is circularly symmetrical about its longitudinal axis X-X and is typically constituted by a primary cover 14, a secondary cover 16, and a central body 18, all centered on the longitudinal axis X-X of the nozzle.

The primary cover 14 is substantially cylindrical or tapering in shape, extending along the longitudinal axis X-X of the nozzle. The central body 18 is disposed coaxially inside the primary cover 14 and is terminated by a portion that is substantially conical.

The secondary cover 16 is also substantially cylindrical or tapering in shape, surrounding the primary cover 14 coaxially and also extending along the longitudinal axis X-X of the nozzle. The primary cover 14 extends longitudinally downstream beyond the secondary cover 16.

It should be observed in the embodiment of FIG. 1 that the central body 18 of the nozzle 10 is of the external type, i.e. the central body 18 extends longitudinally beyond the trailing edge 14a of the primary cover 14.

Nevertheless, the invention is also applicable to a separate-stream nozzle of the internal type in which the trailing edge of the primary cover extends longitudinally beyond the central body so as to cover it completely. Similarly, the invention can also apply to a stream-mixing nozzle in which the trailing edge of the secondary cover extends longitudinally beyond that of the primary cover.

The separate-stream nozzle as defined in this way is secured beneath an airplane wing (not shown in the figures) by means of a support pylon 20 that engages the secondary cover 16 of the nozzle and extends inside the secondary cover as far as the primary cover 14.

The coaxial configuration of the elements of the nozzle 10 serves to define firstly between the primary and secondary covers 14 and 16 an annular first channel 22 for allowing air to flow from the turbomachine and referred to as the secondary stream or the cool stream, and secondly between the primary cover 14 and the central body 18, a second annular channel 24 for allowing an internal gas stream to flow that comes from the turbomachine and that is also referred to as the primary stream or the hot stream.

The primary and secondary streams flowing in these two annular channels 22 and 24 mix together at a trailing edge 14a of the primary cover 14. Similarly, the secondary stream mixes with a stream of outside air traveling round the nozzle at a trailing edge 16a of the secondary cover 16.

At least one of the two covers 14 and 16 of the nozzle 10 has a plurality of repeated patterns 26 serving to reduce the noise from the jet leaving the nozzle.

In the embodiment shown in FIG. 1, the jet noise reduction patterns 26 are disposed on the primary cover 14. Nevertheless, they could equally well be disposed solely on the secondary cover 16, or indeed both on the primary cover and on the secondary cover of the nozzle.

The jet noise reduction patterns 26 are disposed to extend the trailing edge 14a of the primary cover 14 and they are regularly spaced apart from one another in the circumference direction.

Figure 2:
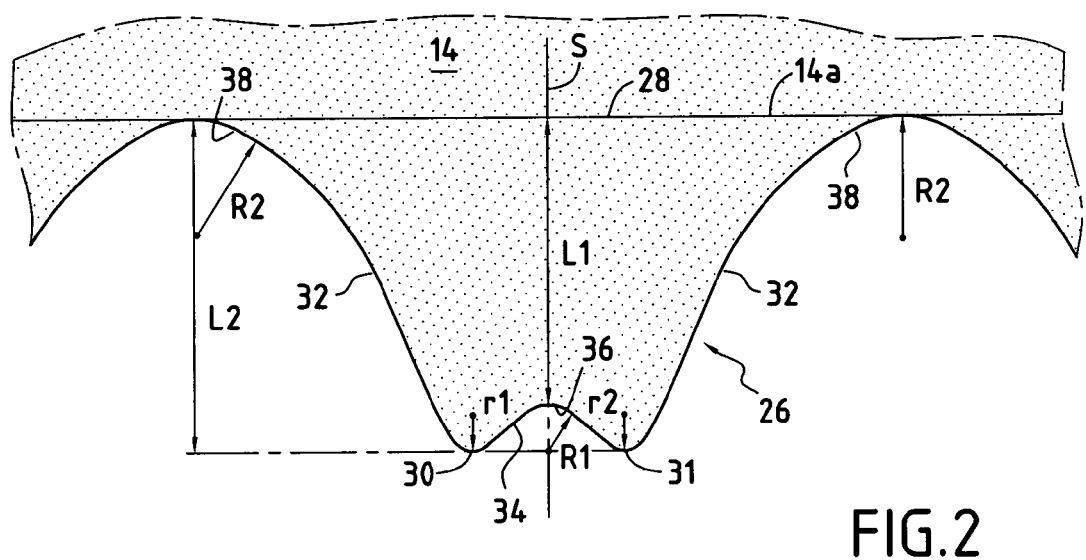
FIG. 2 is a an enlarged view of a jet noise reduction pattern of the FIG. 1 cover.

As shown in greater detail in FIG. 2, each pattern 26 presents an outline that is generally substantially triangular in shape with a base 28 formed by a portion of the trailing edge 14a of the cover 14, and with two vertices (or projections) 30, 31 that are spaced downstream from the base 28 and interconnected by a side 32 of parabolic profile.

The pattern 26 thus presents a shape that is generally triangular from which a substantially triangular cutout has been taken in the vicinity of its downstream end.

In addition, each noise reduction pattern 26 presents a certain number of geometrical characteristics. In particular, each of the vertices 30, 31 of the pattern 26 presents an outline that is substantially curved, with respective radii of curvature r1, r2. The vertices are interconnected by a portion 34 that is substantially curved, having a radius of curvature R1 that is greater than the radii r1, r2 of the outlines of the vertices 30, 31.

It should be observed that the curvature of the portion 34 interconnecting the vertices 30, 31 of the pattern is opposite relative to that of said vertices. Thus, the curved portion 34 presents a low point 36 corresponding to the point of said curved portion that is closest to the base 28 of the pattern (the low point 36 is situated at a distance L1 from the base 28 that is smaller than the distance L2 at which the vertices are situated). By way of example, the ratio L1/L2 may lie in the range 9/10 to 1/2.

The vertices 30, 31 are thus the points of the geometrical profile of the pattern 26 that are furthest downstream relative to the base 28 of the pattern, with the low point 36 interconnecting them being situated longitudinally between said base and said vertices.

Still in the invention, each side 32 of the pattern 26 is connected to the trailing edge 14a of the cover 14 along an outline that is substantially curved, having a radius of curvature R2 that is greater than the radii r1, r2 of the outlines of the vertices 30 and 31, and greater than the radius R1 of the outline of the curved portion 34 interconnecting said vertices (R2>R1>r1, r2).

In the embodiment of FIG. 2, the reference 28 designates the curved connection between each side 32 of the pattern 26 and the trailing edge 14a of the cover 14. It should be observed that the profiles of these connections 38 are continuous with those of the connections between the adjacent patterns and the trailing edge of the cover.

Figure 3:
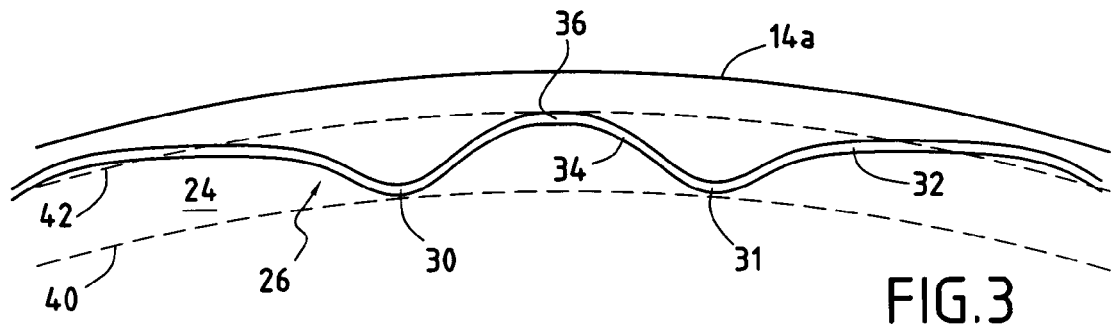
FIGS. 3 and 4 are views of the FIG. 2 pattern, respectively a face view and a profile view.

In addition, and as shown in FIG. 3, the vertices 30, 31 of the pattern 26 of the invention and the curved portion 34 interconnecting them are inclined radially towards the inside of the cover 14 relative to the trailing edge 14a thereof, with the curved portion 34 being offset radially outwards relative to the vertices.

In other words, the pattern 26 penetrates radially into the annular channel 24 along which the hot stream flows, and it penetrates further at each of its two vertices 30, 31 than at the low point 36 of the curved portion 34 interconnecting them.

Thus, the vertices 30, 31 of the pattern are situated substantially on a common circular line 40 that is concentric with the "apex" line representing the trailing edge 14a of the cover and that possesses a diameter that is smaller than the diameter of the apex line. The low point 36 of the curved portion 34 interconnecting the vertices is situated on a circular line 42 that is likewise concentric with the apex line and that possesses a diameter smaller than the apex line but greater than the line 14 passing through the vertices.

Furthermore, it should be observed that the overall radial inclination of the pattern 26 is preferably limited so that the pattern lies within a boundary layer generated by the flow of the gas streams in the vicinity of the profile of the cover 14.

Figure 4:
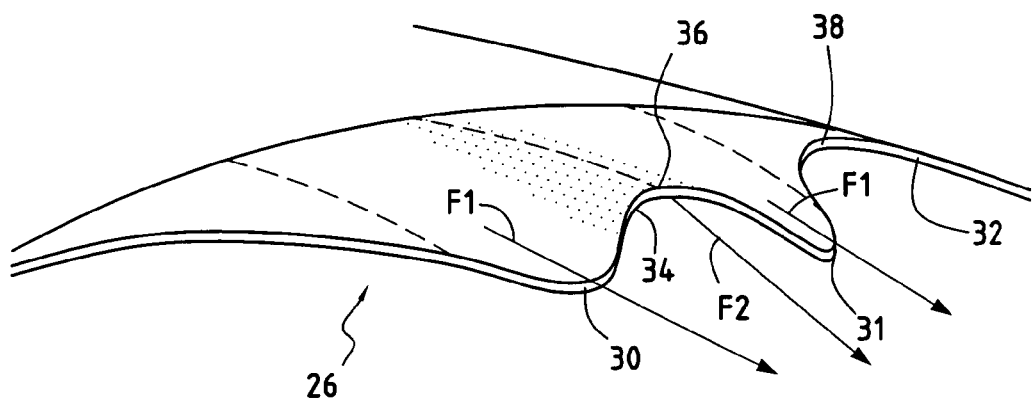

As shown diagrammatically in FIG. 4, such a profile for the noise reduction pattern serves to cause the outer gas streams F1 on the outside of the pattern and flowing over its vertices 30, 31 to converge towards the center of the pattern so as to confine the inner gas stream F2 on the inside of the pattern and exiting via the curved portion 34 interconnecting said vertices. In addition, given that there is a radial offset between the vertices 30, 31 of the pattern and the curved portion 34 interconnecting them, the outer streams F1 cross the inner stream F2 downstream from the pattern. Mixing between the inner and outer streams is thus increased.

According to an advantageous characteristic of the invention shown in FIG. 2, the vertices 30, 31 of each pattern 26 are situated at heights L2 relative to the base 28 that are substantially equal to each other.

According to another advantageous characteristic of the invention, also shown in FIG. 2, the shape of the patterns 26 presents symmetry about a midplane S of said pattern containing the longitudinal axis of the cover. As a result of such symmetry, the low point 36 of the curved portion 34 interconnecting the vertices 30, 31 of the pattern is situated in the plane of symmetry S, and the radii of curvature r1, r2 of the vertices 30, 31 are equal to each other with the sides 32 of the pattern having the same parabolic profile.

Figure 5:
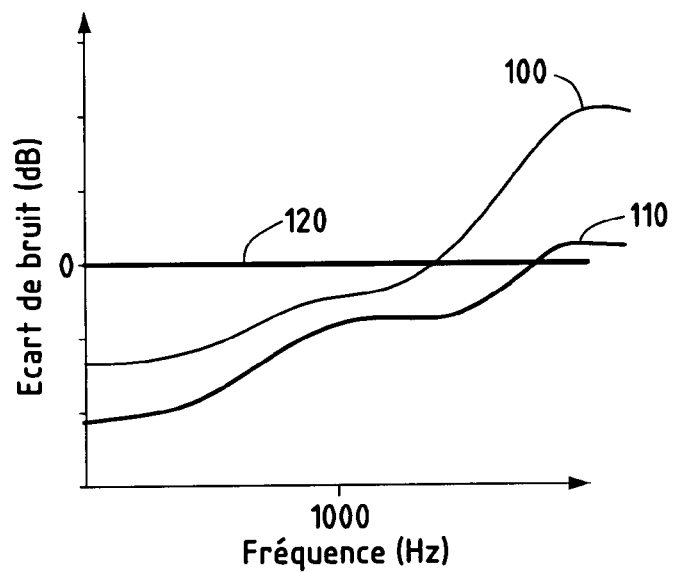
FIG. 5 is a graph showing curves comparing the noise generated by separate-stream nozzles.

Numerical simulations of the noise level generated by a separate-stream nozzle having its primary cover fitted with noise reduction patterns of the invention have been performed. The results of these simulations are shown in the comparative graph of FIG. 5.

The graph in this figure plots curves showing the noise differences in decibels as a function of frequency for a nozzle having its primary cover provided with noise reduction patterns that are merely triangular in shape (curve 100) and a nozzle having its primary cover provided with noise reduction patterns of the invention (curve 110). The noise differences are calculated relative to a curve 120 corresponding to the noise generated by a separate-stream nozzle in which the primary cover does not have any noise reduction patterns.

From the graph, it can be seen that using noise reduction patterns of the invention serves to reduce noise at low frequency (less than about 1000 hertz (Hz)), not only relative to a nozzle that does not have patterns (curve 120), but also relative to a nozzle in which the primary cover is fitted with patterns that are merely triangular (curve 100). The particular shape of the patterns of the invention have another advantage of limiting the extent to which the high frequency component of the noise (greater than about 1000 Hz) is increased compared with patterns that are merely triangular. In particular, it can be seen that the special shape of the patterns of the invention serves to generate high frequency noise that is close to that generated by a nozzle in which the primary cover does not have any noise reduction patterns.

What is claimed is:

1. An annular cover for a turbomachine nozzle, the cover having a plurality of patterns extending the trailing edge of said cover and spaced apart circumferentially from one another, each pattern having an outline of substantially triangular shape with a base formed by a portion of the trailing edge of the cover and with two vertices spaced downstream from the base and each connected thereto by a side, wherein for each pattern:

each vertex presents a substantially curved outline and the patterns are interconnected by a substantially curved portion having a radius of curvature greater than the radii of curvature of the outlines of said vertices;

each side is connected to the trailing edge of the cover via an outline that is substantially curved having a radius of curvature greater than the radii of curvature of the outlines of the vertices and greater than the radius of the outline of the curved portion interconnecting said vertices; and the vertices and the curved portion interconnecting them are inclined radially towards the inside of the cover relative to the trailing edge thereof with the curved portion interconnecting said vertices being offset radially outwards relative to the vertices.

2. A cover according to claim 1, in which the vertices of each pattern are situated at heights from the base that are substantially equal.

3. A cover according to claim 1, in which at least one of the patterns presents symmetry about a midplane of the pattern containing the axis of symmetry of the cover.

4. A turbomachine nozzle having a primary cover disposed about a longitudinal axis of the nozzle and a secondary cover disposed coaxially around the primary cover, wherein the primary cover and/or the secondary cover is/are a cover according to claim 1.

5. A turbomachine including a nozzle having at least one cover according to claim 1.

* * * * *